July 26, 1955     L. J. BISHOP     2,713,936
TROLLEY STRUCTURE FOR CONVEYORS
Filed June 21, 1954     2 Sheets-Sheet 1
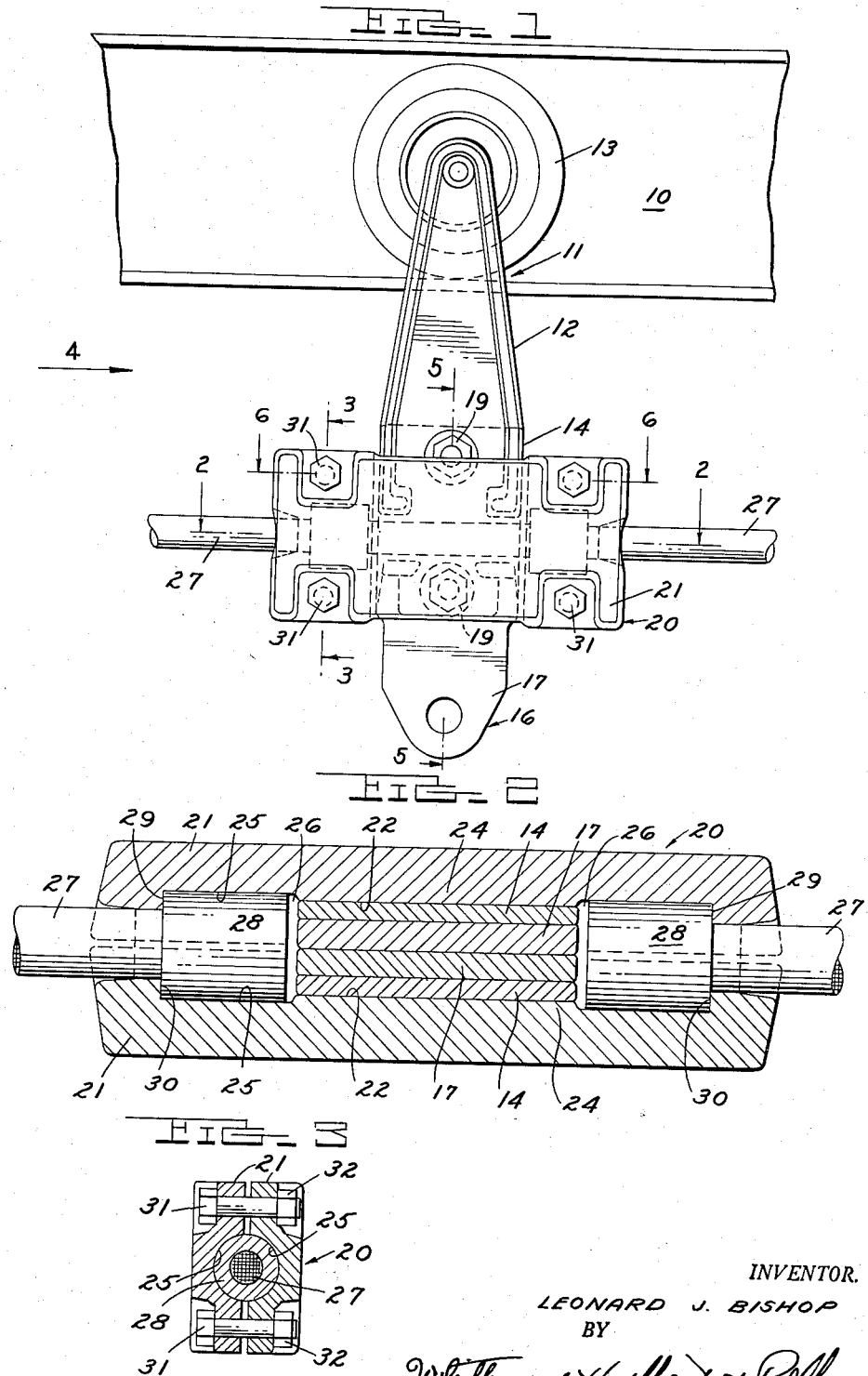
INVENTOR.
LEONARD J. BISHOP
BY
ATTORNEYS

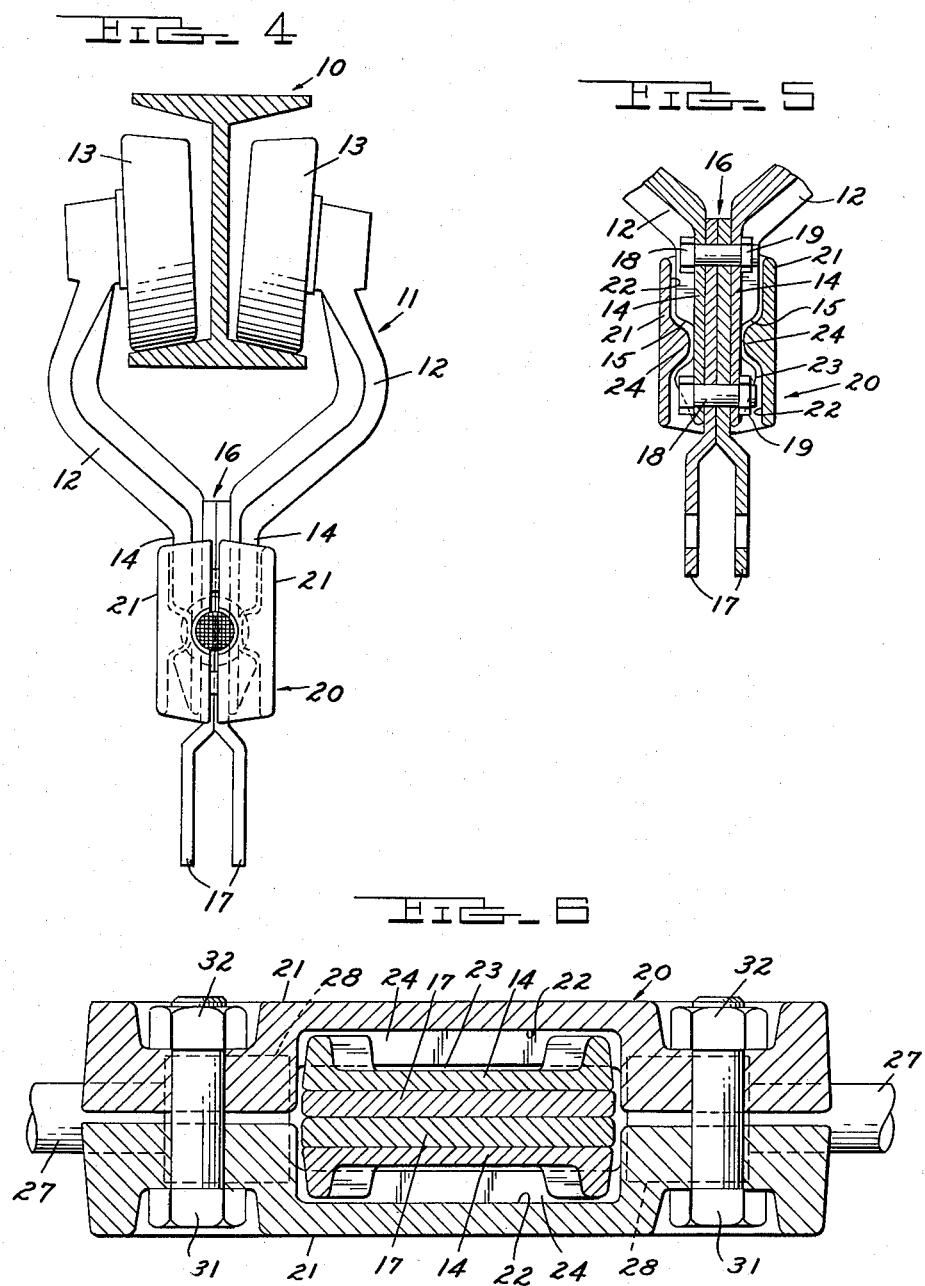

United States Patent Office 2,713,936
Patented July 26, 1955

2,713,936

TROLLEY STRUCTURE FOR CONVEYORS

Leonard J. Bishop, Birmingham, Mich., assignor to Mechanical Handling Systems Inc., Detroit, Mich., a corporation of Michigan Application June 21, 1954, Serial No. 438,030

4 Claims. (Cl. 198—177)

This invention relates generally to conveyors and refers more particularly to conveyors of the type having trolleys movable along a track by a flexible linear member.

It is an object of this invention to provide an adapter rendering it possible to use the same trolley structure in connection with either a chain or cable type of propulsion. In accordance with the present invention a trolley designed to be driven by a link type of conveyor chain may be readily converted for attachment to a cable driving member without altering the trolley structure.

The foregoing as well as other objects will be made more apparent as this description proceeds especially when considered in connection with the accompanying drawings wherein:

Figure 1 is a side elevational view of a part of a conveyor system and showing an adapter embodying the features of this invention.

Figure 2 is a longitudinal sectional view taken on the line 2—2 of Figure 1;

Figure 3 is a cross sectional view taken on the line 3—3 of Figure 1;

Figure 4 is an end elevational view looking in the direction of the arrow "4" in Figure 1;

Figures 5 and 6 are respectively sectional views taken on the lines 5—5 and 6—6 of Figure 1.

In Figures 1 and 4 of the drawings, the numeral 10 designates a length of track comprising a rail having an I shaped cross section, and the numeral 11 indicates a trolley. The trolley 11 comprises a pair of arms 12 having the upper ends respectively positioned at opposite sides of the track and having rolls 13 respectively supported on the arms 12 at the upper ends in positions to engage the flanges at the bottom of the track 10.

The arms 12 converge toward one another beneath the track 10 and terminate in depending portions 14 having laterally outwardly opening channels 15 in the outer sides thereof for respectively receiving the opposed bars of a link type conveyor chain, not shown. Positioned between the depending portions 14 of the arms 12 is a hanger 16 comprising a pair of sections 17 clamped together by bolts 18 and nuts 19. The bolts 18 extend through aligned openings in the arms 12 and sections 17 and the nuts are threaded on the bolts to cooperate with the heads on the bolts to clamp the depending portions 14 of the arms 12 and the sections 17 of the hanger 16 together.

The trolley 11 briefly described above is of the type which is propelled along the track 10 by a link type chain having laterally spaced bars respectively engaged in the channels 15 formed in the trolley arms 12. However, in some installations it is desired to employ a flexible cable instead of a chain for propelling the trolley and this is rendered possible with the present invention without changing the trolley by providing an adapter 20.

The adapter 20 comprises a pair of elongated sections in the form of plates 21 having registering recesses 22 intermediate the ends thereof cooperating to form an opening 23 of sufficient dimension to receive the depending portions 14 of the arms 12 with the hanger sections 17 clamped therebetween. A pair of projections 24 respectively extend laterally inwardly from the base portions of the recesses and the length of the projections preferably corresponds to the length of the recesses. In any case the projections 24 are of a size to respectively extend into the channels 15 formed in the depending portions 14 of the trolley arms 12.

Each end of the plates 21 are formed with registering recesses 25 cooperating to provide openings 26 at opposite ends of the adapter. The outer ends of the recesses 25 provide openings at opposite ends of the adapter of a size to receive cables 27 and the inner ends of the recesses 25 provide enlarged openings for accommodating terminals 28 on the ends of the cables 27. The terminals 28 have a diameter greater than the diameter of the cables 27 and provide annular shoulders 29 at the inner ends of the terminals which engage shoulders 30 formed on the plates 21 by the enlarged inner ends of the recesses 25.

The plates 21 are removably clamped together by bolts 31 and nuts 32 arranged in pairs at each end of the adapter. The bolts 31 of each pair respectively extend through aligned openings in the plates at opposite sides of the openings 26 and the nuts 32 are threadably mounted on the bolts to cooperate with the heads on the bolts to not only clamp the plates 21 together but to also secure the plates to the trolley arms 12.

It has been stated above that the depending portions 14 of the trolley arms 12 extend through the opening 23 formed by the registering recesses in the plates 21 of the adapter and that the projections 24 on the respective plates extend into the channels 15 in the depending portions 14. This structure serves to accurately locate the adapter 20 on the trolley and prevents vertical displacement of the adapter relative to the trolley. However, as shown in Figure 6 of the drawings the opposite sides of the depending portions 14 of the trolley arms 12 abut the adjacent ends of the opening 23 in the adapter and the shoulders 29 on the terminals 28 abut the shoulders 30 on the adapter so that the driving thrust of the cables is transmitted to the adapter and trolley without imparting sresses to the bolts.

It follows from the foregoing that the adapter 20 may be readily installed on conventional chain propelled trolleys to convert the latter to cable propulsion without altering or modifying the structure of the trolley. It is also apparent that the trolley 10 may be just as quickly converted back to chain propulsion by merely removing the adapter 20 and associated cables.

What I claim as my invention is:

1. In combination with a conveyor trolley having a supporting part provided with laterally outwardly opening channels at opposite sides thereof for respectively receiving opposite bars of a conveyor chain, an adapter comprising separable sections respectively engageable with opposite sides of the supporting part and removably clamped to the supporting part, projections respectively extending laterally inwardly from the sections into the channels aforesaid of the supporting part, and means on the sections cooperating to clamp a cable thereto.

2. In combination with a conveyor trolley having a supporting part provided with laterally outwardly opening channels at opposite sides thereof for respectively receiving opposite bars of a conveyor chain, an adapter comprising separable plates having portions intermediate the ends cooperating to provide a space for receiving the supporting part and having portions at opposite ends cooperating to receive adjacent ends of cables, projections extending laterally inwardly from the intermediate portions of the plates into the channels in the supporting part, and means for clamping the plates to the supporting part and to the adjacent ends of the cables.

3. In combination with a conveyor trolley having a supporting part provided with laterally outwardly opening channels at opposite sides thereof for respectively receiving opposite bars of a conveyor chain, an adapter comprising separable plates having recesses intermediate the ends cooperating to provide an opening for receiving the supporting part and having recesses at the opposite ends cooperating to provide shouldered openings for respectively receiving terminals on the adjacent ends of cables, projections extending laterally inwardly from the walls of the first recesses into the channels in the supporting part, and means for clamping the plates to the supporting part and to the adjacent ends of the cables.

4. In combination a conveyor trolley having arms respectively provided with laterally outwardly opening channels in the outer sides thereof for respectively receiving the opposed bars of a conveyor chain, hanger members extending between the arms and secured to the latter, an adapter comprising a pair of plates having recesses intermediate the ends cooperating to form an opening for receiving the arms with the hanger members therebetween and having recesses at opposite ends cooperating to form shouldered openings for respectively receiving terminals at the ends of cables, a pair of projections respectively extending laterally inwardly from the walls of the first recesses into the channels in said arms, and means for removably clamping the plates to the arms and cable terminals.

No references cited.